(12) United States Patent
Fairweather

(10) Patent No.: US 7,369,984 B2
(45) Date of Patent: May 6, 2008

(54) PLATFORM-INDEPENDENT REAL-TIME INTERFACE TRANSLATION BY TOKEN MAPPING WITHOUT MODIFICATION OF APPLICATION CODE

(76) Inventor: John Fairweather, 1649 Wellestoy Dr., Santa Monica, CA (US) 90405

( * ) Notice: Subject to any disclaimer, the term of this patent is extended or adjusted under 35 U.S.C. 154(b) by 819 days.

(21) Appl. No.: 10/357,289

(22) Filed: Feb. 3, 2003

(65) Prior Publication Data
US 2003/0171911 A1    Sep. 11, 2003

Related U.S. Application Data

(60) Provisional application No. 60/353,487, filed on Feb. 1, 2002.

(51) Int. Cl.
*G10F 17/20*    (2006.01)
(52) U.S. Cl. .......................................................... 704/8
(58) Field of Classification Search .................... 704/8, 704/9
See application file for complete search history.

(56) References Cited

U.S. PATENT DOCUMENTS

| | | | | |
|---|---|---|---|---|
| 4,870,610 A * | 9/1989 | Belfer | ............................ | 704/2 |
| 5,303,392 A | 4/1994 | Carney et al. | ............... | 717/153 |
| 5,339,406 A | 8/1994 | Carney et al. | ................. | 714/45 |
| 5,375,241 A | 12/1994 | Walsh | ......................... | 719/331 |
| 5,546,304 A * | 8/1996 | Marschner et al. | ............. | 704/4 |
| 5,586,329 A | 12/1996 | Knudsen et al. | ............. | 717/108 |
| 5,596,752 A | 1/1997 | Knudsen et al. | ............. | 717/117 |
| 5,682,535 A | 10/1997 | Knudsen | ...................... | 717/117 |
| 5,870,608 A | 2/1999 | Gregory | ...................... | 717/131 |
| 5,900,871 A * | 5/1999 | Atkin et al. | ..................... | 704/8 |
| 5,960,382 A * | 9/1999 | Steiner | .......................... | 704/2 |
| 6,083,282 A | 7/2000 | Caron et al. | ................. | 717/101 |
| 6,092,036 A * | 7/2000 | Hamann | ......................... | 704/8 |
| 6,219,830 B1 | 4/2001 | Eidt et al. | .................... | 717/139 |
| 6,275,790 B1 * | 8/2001 | Yamamoto et al. | ............ | 704/8 |
| 6,311,151 B1 * | 10/2001 | Yamamoto et al. | ............ | 704/8 |
| 6,321,190 B1 * | 11/2001 | Bernardes et al. | ............. | 704/8 |
| 6,748,585 B2 | 6/2004 | Proebsting et al. | ......... | 717/136 |
| 6,865,716 B1 * | 3/2005 | Thurston | ........................ | 704/8 |
| 6,885,985 B2 * | 4/2005 | Hull | .............................. | 704/2 |

(Continued)

OTHER PUBLICATIONS

Anil Khatri, Office Action, Jul. 3, 2006, Related U.S. Appl. No. 10/357,326 (now allowed).

(Continued)

*Primary Examiner*—Ŝmits Tālivaldis Ivars
(74) *Attorney, Agent, or Firm*—Merchant & Gould PC; Stanley J. Gradisar

(57) ABSTRACT

A system and method for translating one or more tokens from one language to another is provided. A lookup map mapping characteristics of the tokens in one language and the corresponding characteristics to be used in a foreign language is provided. A set of "content" dictionaries mapping tokens in a base language into the corresponding token in another language is also provided and, in conjunction with the characteristics of the foreign token, provides the basis for a translated interface. A GUI environment may initiate a request to translate whenever it is about to transmit a token to the interface or the tokens may be trapped prior to receipt by the display. Other tools and functions are also provided that instruct the interface to modify the location, ordering and other attributes of the token as communicated by the interface.

33 Claims, 3 Drawing Sheets

U.S. PATENT DOCUMENTS

| | | | |
|---|---|---|---|
| 6,964,014 B1* | 11/2005 | Parish | 704/260 |
| 6,981,031 B2* | 12/2005 | French et al. | 709/218 |
| 6,993,568 B1* | 1/2006 | Hauduc et al. | 704/8 |
| 7,024,546 B2* | 4/2006 | Real | 704/8 |
| 7,123,694 B1* | 10/2006 | Hecker | 379/88.05 |
| 2002/0133523 A1* | 9/2002 | Ambler et al. | 707/536 |
| 2003/0004703 A1* | 1/2003 | Prabhakar et al. | 704/8 |
| 2003/0009323 A1* | 1/2003 | Adeli | 704/8 |
| 2004/0044836 A1 | 3/2004 | Wong et al. | 711/103 |

OTHER PUBLICATIONS

Pierre Bataille, Office Action, Jun. 27, 2005, Related U.S. Appl. No. 10/357,288 (now U.S. Patent No. 7,103,749).

* cited by examiner

PLATFORM-INDEPENDENT REAL-TIME INTERFACE TRANSLATION BY TOKEN MAPPING WITHOUT MODIFICATION OF APPLICATION CODE

This application claims the benefit of U.S. Provisional Application Ser. No. 60/353,487 filed on Feb. 1, 2002 and titled "INTEGRATED MULTIMEDIA INTELLIGENCE ARCHITECTURE" which is incorporated herein by reference in its entirety for all that is taught and disclosed therein. This application is also related to Application Serial No. 10/357,326 filed on Feb. 3, 2003 titled "System and Method for Analyzing Data", now U.S. Patent Application Publication 2003/0187633 A1, now allowed, by the same inventor as this invention, and to Application Serial No. 10/357,288 filed on Feb. 3, 2003 titled "System and Method for Managing Memory," U.S. Patent Application Publication 2003/0182529 A1, now U.S. Pat. No. 7,103,749, by the same inventor as this invention, both of which are incorporated herein by reference in their entirety for all that is taught and disclosed therein.

BACKGROUND OF THE INVENTION

The process of 'localizing' a software application (i.e., changing it to display its user interface in another language other than English) has historically been a very expensive and time-consuming business. So much so that the majority of software programs are never localized to any other language. An industry has sprung up to try to help companies localize their software by providing localization experts and target language speakers. These services are expensive and require the disclosure of sensitive trade secrets, such as source code, to third parties. In the last five years or so, the operating system manufacturers and programming language designers have made some steps towards trying to alleviate these problems. In all such cases, however, the basic approach is to have all user interface strings come from a 'resource' that is loaded from a different location depending on the language that is being used by the program. In this way, as long as the programmer always obtains text from this source through the mechanism provided, the code written should operate equally well in another language provided that all of the corresponding resources are available in that language. This approach, while an improvement over the previous situation, still has many shortcomings.

One problem with this approach is that it forces all code to be written from the outset with localization in mind. The programmer is no longer free to simply add or alter the text content of the user interface and certainly cannot use a string constant in the program source code. Because there is a natural tendency for programmers to use such content, however, it will often happen regardless of localization policies. The result of this approach to localization is that the program becomes unreadable, since it is very difficult to see by examining the code what is being 'said'. Another problem with this approach is its limited ability to handle variable strings (i.e., those strings in which a portion of the string, such as the time, varies while the rest is constant). Yet another negative in this approach, regardless of the particular flavor (since all are basically similar), is that when strings are read back from the user interface elements (e.g., the name of a button), the strings can no longer be assumed to be in English and thus code that manipulates the UI cannot perform simple operations like checking if the button name is "OK" but must instead find a localization agnostic way to achieve this simple operation.

The end result of all these shortcomings is that designing a program for localization takes a lot of work and discipline, makes the code base obscure and highly dependant on the localization metaphor, and denies to programmers the simplifying model that their application is running only in English. What is needed then is another approach to localization that does not require any special calls from the programmer, does not deny the use of simple English string constants, is platform and language independent, and maintains the ability to read back English from the elements of the UI.

SUMMARY OF THE INVENTION

The present invention provides a localization system that is completely platform independent, requires no support from the underlying language or operating system, meets all of the goals listed above, and also provides some other significant benefits not possible with traditional resource based approaches. In the preferred embodiment, the only time text is localized is as the text is actually drawn to the screen, it is not even localized within the building blocks (controls, windows etc.) of the graphical user interface (GUI) environment being used. Initially, the GUI environment makes a call for the translation immediately prior to rendering the interface on screen. This callback can be facilitated via a single entry point in the "draw string" call which is generally made to the underlying OS by the GUI environment. The dictionaries for a given GUI are built up automatically at the time of rendering and do not need to be predefined or set up. The key to this approach is the ability to very rapidly look up English language strings in a number of translation dictionaries so that the strings can be translated in real-time and on-the-fly. In one embodiment, the dynamic and fast inverted file dictionary used for this purpose is the lexical analyzer functionality described in Appendix 1 combined with the "string list" capability described in Appendix 2. Alternatively, the "string list" capability, or indeed any rapid string lookup facility, will suffice.

The primary components of this invention are:

A lookup mapping between text fonts in English (e.g., Courier, Geneva etc.) and the corresponding font to be used in a foreign language. Often there is a 'bilingual' font, which is one whose character encodings can display both English text and foreign text (usually for 8-bit encodings these characters have the most significant bit set for non-English characters).

A set of dictionaries mapping English phrases into the corresponding phrase in another language as expressed in the text encoding for the mapped font selected for that language.

Preferably, a GUI environment that is capable of making a callback whenever it is about to write a string to the interface. Alternately, one can 'patch' the DrawString( ) call of the underlying OS (which will be used by virtually any GUI environment) so that the GUI environment can be trapped when it draws and caused to translate. This patching approach, while practical, is less desirable and provides less control over some of the more exotic features described below. The parameters to the DrawString( ) callback (or patch) must include the English string to be drawn (modified on translation), the bounding rectangle into which the string will be drawn (may be modified), the font characteristics (font, size, style etc. may be modified), and the text justification (may be modified).

DETAILED DESCRIPTION OF THE PREFERRED EMBODIMENT(S)

Appendix A (attached) provides a sample C language Application Programming Interface (API) to the translation facility of this invention.

Figure 1:
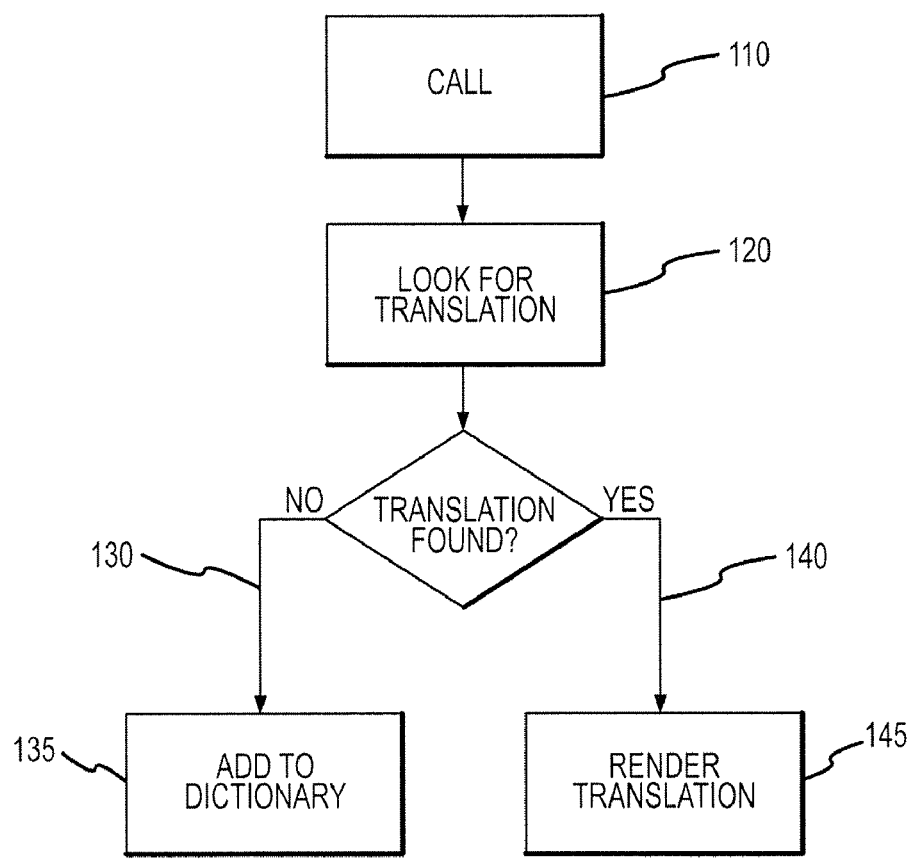
FIG. 1 illustrates the callback translation algorithm of the present invention.

A key difference with conventional approaches and the present invention is that the dictionaries of the present invention need not be pre-defined but can instead be created dynamically at the time of rendering. Referring now to FIG. 1, the "callback" translation process is illustrated. When a program is running in foreign language 'X' and it makes a call 110 to render the string "the cat sat on the mat" in that language, the callback looks 120 for a translation of this phrase and if not found 130, adds 135 the phrase to the dictionary of phrases that need to be translated. If found 140, the phrase associated with the string in the dictionary of phrases is rendered 145 by the program. This means that the dictionary creation happens automatically as a result of program execution without regard to where the string itself came from. This also means that the programmer is free to use English string constants in his code while being assured that such constants will translate just like any other strings. This is a huge simplification of the programming model. The preferred way to dynamically build dictionaries and rapidly look up large numbers of phrases being drawn to the UI in these dictionaries, is to use the lexical analyzer facility described in Appendix 1 in combination with the "string list" capability described in Appendix 2. Alternatively, almost any sufficiently rapid string lookup capability will suffice. The approach described in the preferred embodiment (i.e., to use dynamic lexical analyzer and string list construction) is both fast and capable of very large dynamic dictionary building.

The lexical analyzer and string list tables that make up the "inverted file" dictionary lookup are saved between runs into files, and each dictionary is named based on the context of its use. There may be any number of distinct dictionaries in the system depending on how may different subsystems make calls back into the translation API and for what purposes. The primary routines involved in this dictionary construction and reference process (in addition to the DrawString( ) callback) are XL_GetString( ), XL_vSprintfCatHdl( ), XL_SprintfCatHdl( ), XL_GetDictionary( ), XL_SaveDictionary( ), and XL_FlushDictionaries( ).

The routine XL_GetDictionary( ) returns a reference to a named source (English) or target (other language) dictionary. If the dictionary is not currently in memory, it is loaded. If it does not exist, it is created (empty) as is the corresponding dictionary file. A programmer can use this function to explicitly force pre-loading of a dictionary before use. Alternatively, automatic saving may be suppressed, the handle to the source dictionary obtained and then a save can be forced by the routine. This is most useful when it is expected that many words will be added to the dictionary at once as this approach optimizes the process so that only a single save is required. Referring now to Appendix A, pseudo code for this routine is provided. In this example, if the current language is English and 0 is passed for 'aLanguage', this function will return NULL since there is no target dictionary for English. To obtain the source dictionary, 'kAmericanEnglish' (in this example, the language from which all others are translations) must be passed explicitly. If a dictionary has already been referenced and is thus loaded into memory cache, it is simply returned.

XL_SaveDictionary( ) saves a dictionary to the corresponding dictionary file. This action is normally automatic unless dictionary saves are suppressed (using the option described above). In such a case, the dictionary reference will need to be passed using this routine in order to "force" a save after all additions have been made.

Another routine is provided, XL_FlushDictionaries( ), which forces any un-saved dictionary changes to be flushed to file. This would be most applicable when automatic saves have been suppressed.

Another routine is provided, XL_GetDictionary( ), which provides basic dictionary building operations. For each dictionary(ies) involved, the routine looks up the English language phrase in that dictionary, and if not found, adds the phrase to the target dictionary (and the source if not found there). This process is illustrated in FIG. 1.

In the preferred embodiment, this invention maintains a list of those languages that are supported and the corresponding language name and language code (which is basically a lookup index into the various tables required to support the language). A parameter, 'aLanguage', corresponds to the index necessary to locate the language concerned in the supported language tables. Two special cases are defined. A language code of 'kCurrentLanguage ==0' is interpreted to mean the language currently in effect (saved in a global). Most if not all calls to the translation facility will specify a language code of zero, which will cause the result to automatically track the language the user has selected. This language may be changed as the program is running which will result in the immediate and dynamic translation of the UI into the newly selected language. This is a far more powerful capability than most localization approaches which tend to work only in one language. Indeed, it is so useful to be able to dynamically flip languages that language code 'kAlternateLanguage' is a special case to mean the 'alternate language' which is a user configurable preference (saved in a global). This improvement reflects the fact that most users of foreign languages may still need to flip dynamically back and forth between that language and English as part of their normal workflow. As a result, any application built to work in conjunction with this translation methodology can provide a user with the ability to flip the language used to render the UI "on the fly."

For any supported language, this methodology also provides certain basic mapping tables indexed by language code. These are as follows:

A sort order mapping. This maps each character encoding for the language into their corresponding lexical sort order. This is used so that list sorting in the UI occurs properly. Access to this capability from the UI and code is via the routines, in this embodiment XL_strcmp( ), XL_strncmp( ), XL_strcmpNC (case insensitive), and XL_strncmpNC(case insensitive). These functions are essentially identical to the standard C libraries of the same name but utilize the language code to select the necessary sort order mapping table.

A list of additional punctuation characters specific to the target language.

A table mapping language code index for such things as language name, script system (e.g., Roman, Cyrillic etc.), sort order mapping table, and punctuation character list.

A table encoding for each character in the language knowledge of whether that character is a letter, number, etc. These characteristics provide language dependant capabilities identical to those provided for English by the standard ANSI C library functions. In the illustrated embodiment, these capabilities can be accessed via the following functions: XL_isalnum( ), XL_isalpha( ), XL_iscntrl( ),XL_isdigit( ), XL_isgraph( ), XL_islower( ), XL_isprint( ), XL_ispunct( ), XL_isspace( ), XL_isupper( ), XL_isxdigit( ), and XL_isdiacritic( ). The last routine is applicable only to non-Roman script systems and has no ANSI correlate. This routine determines if the character involved is in fact a diacritical mark (e.g., the French circumflex accent) and not a basic character in the alphabet. Diacriticals are crucial in constructing some non-Roman script languages such as Arabic.

A pair of tables mapping upper and lower case characters to the alternate case equivalent (if relevant in the script system concerned). These mappings could also be accessed by separate routines, XL_tolower( ) and XL_toupper( ), which are language dependant versions of the ASCI C equivalents.

In the preferred embodiment, a number of API routines are also provided that can be readily implemented as simple operations on these mapping tables and are not further described herein.

The key algorithm of this invention is the routine XL_GetString( ). This routine, as illustrated in FIG. 1 above, translates an English String to another supported language. If the translation cannot be performed, the English string is copied over unmodified and the function returns FALSE. Otherwise the 'xlatedStr' output will contain a pointer to the translated output string. In the case that a translation cannot be made, the un-translatable string is added to the specified dictionary (which is updated/saved). This means that at a later time, either a person or a separately automated process can enter the necessary translation in the target language into the dictionary. Alternatively, the dictionary can be exported as a glossary containing a series of English strings together with the translated string on each line where the two parts are tab delimited. Such glossaries can be bulk translated by language experts and then re-imported to form the corresponding run-time dictionaries.

The details of this import/export process can be readily deduced by application of the other API functions described herein. If a dictionary selection string is set to NULL, the function XL_GetString( ) will attempt to find a translation in all available dictionaries, starting with the last one in the list and ending with the standard built in dictionary. By starting with the last dictionary on the list, custom dictionaries may be used to override a standard dictionary. In this NULL case, the English string associated with a failed translation will be written to the standard dictionary and saved. In addition to simple translation of strings, this function can perform complete sprintf( )-like functionality including the independent translation of each substitution sequence once it has been substituted.

The present invention is also capable of re-mapping the substitutions to a different order within the output string in order to account for the different grammar of other languages. To illustrate this, assume that the call below that requests a translation of a dynamic English string into the equivalent Arabic:

```
XL_GetString( NULL,kArabic,&resultStr,
    "Schrodinger's cat %s has %5.3f lives left out of%d",
    kDoSprintfTranslate,catName,livesLeft,9);
``` and that in the Arabic standard dictionary, the translation of the string above contains: ". . . arabic1. . . %2. . . arabic2. . . %0. . . arabic3. . . %1". In this case, the number and type of the substitution specifiers must exactly match the number in the English string, however, the order may be different (to account for different word ordering between languages). In this example, the correct re-ordering operations are performed by substituting the specifier '%' in the translated string followed by a decimal number (which gives the zero based index of the corresponding substitution string in the original English string). This process allows the translation capability to easily handle variable strings without causing undue dictionary clutter, and is yet another advantage of the translation scheme of this invention. This capability is not supported by other existing translation schemes. Substitutions that cannot be translated will be made in English into the foreign string. Numeric values are translated into the appropriate foreign symbols when appropriate (e.g., Arabic) unless suppressed using 'kNoNumericTranslate' option.

Referring now to Appendix A, the pseudo code for the algorithm involved in XL_GetString( ) is provided. The routines XL_vSprintfCatHdl ( ) and XL_SprintfCatHdl ( ) are merely specialized forms of calls to XL_GetString( ), which both call, and are provided primarily as a convenience.

The process of looking up and mapping the strings detailed in the algorithm above is, based on the routine LX_Lex( ) which yields a string list offset (ET_Offset-Appendix 2) to the translated string, while adding strings to the dictionary is essentially a call to LX_Add( ). Both lexical functions are fully described in that application, which is expressly incorporated herein.

Another algorithm involved in the preferred embodiment of this invention is the DrawString( ) callback that makes the actual transformation prior to rendering to the screen. The pseudo code for this function is provided in Appendix A (depending on GUI support level). This callback first determines the current language selected (via a global) and the font and other settings passed in on the call from the GUI framework. In one embodiment, the callback could include logic associated with text justification and font mapping, which can be implemented in any number of ways that would be obvious to those skilled in the art. In the preferred embodiment, the callback would also include two other calls. The first is a call to XL_GetString( ) to make the actual translation (explained above). The second call is to a routine, hereinafter called UI_ShrinkToFit( ). This function will attempt to modify a string's drawing attributes to get it to fit within a specified rectangle. This function will condense, and/or modify the text style, and/or shrink the text down to a size that fits within the bounding rectangle. The font size lower limit is 6 points. In the end the text will have its Font size and Font Style manipulated to get as much of the text in the text rectangle. in the preferred embodiment, the function will also return the fixed number of pixels that would be required to adjust the rectangle to keep the text centered vertically. This routine would be particularly useful if the translated string contained a vastly different number of characters than did the original and thus may no longer fit comfortably in the bounding rectangle originally specified on the screen. Since the bounding rectangle of the text cannot be grown without the risk of it clobbering other aspects of the GUI, this routine is responsible for making whatever adjustments are necessary to accommodate the new text into the space originally laid out for the English control text. In many cases, this routine will reduce the font size which may in turn result in text that is not vertically centered. In such a case, this 'fix' amount would be returned by UI_ShrinkToFit( ) and used to adjust the bounding rectangle in order to keep the text centered.

The exact details of this shrinking process depend on the underlying font support of the native operating system. The basic approach, however, is to loop attempting successive modifications to the font rendering characteristics until the text can be made to fit including (in order) adjusting:

a) The number of lines of text displayed (including use of word wrapping)

b). The bounding box itself (within clipping limits)

c) The text style may be changed to 'condensed' d) Other style attributes such as 'bold', 'outline', 'shadow' etc. may be stripped off e) The font size may be reduced gradually down to a 6-point lower limit.

Figure 2:
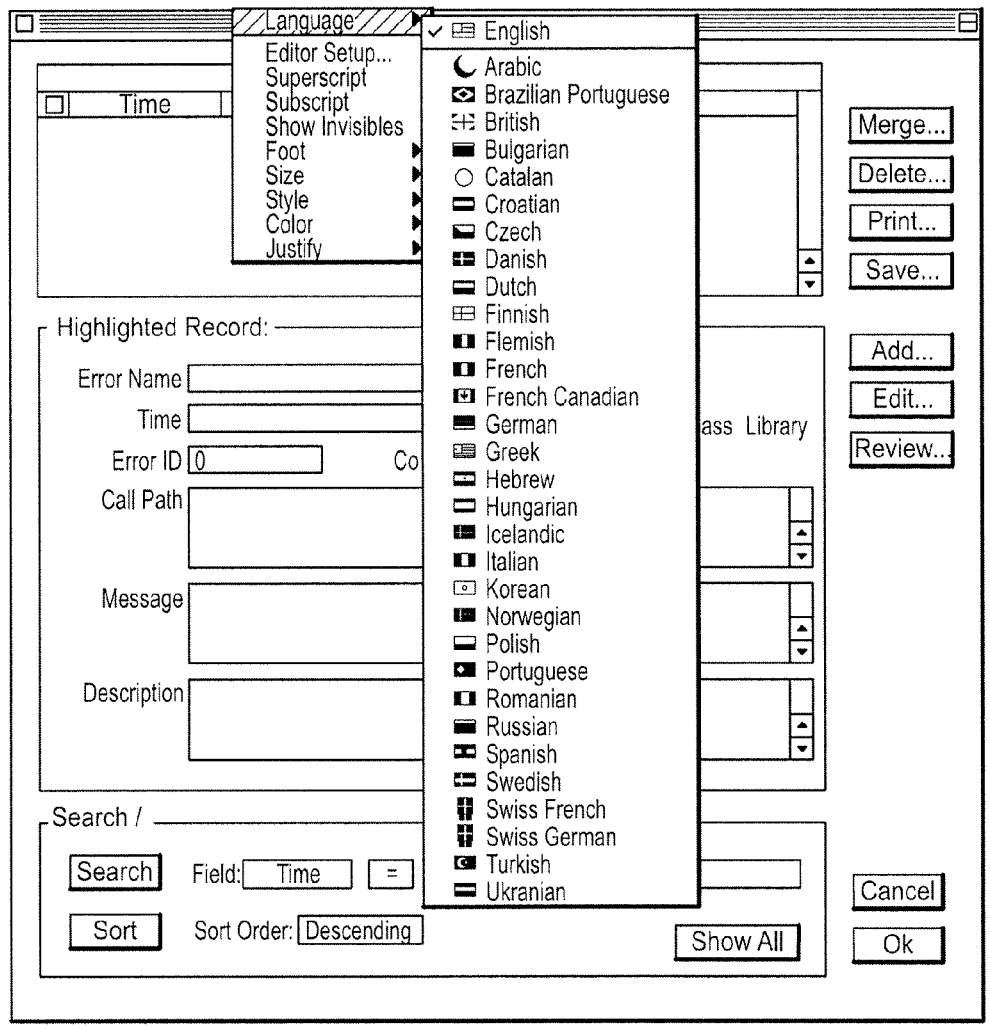
FIG. 2 illustrates a sample screen for selecting the language to be used to display the GUI.
Figure 3:
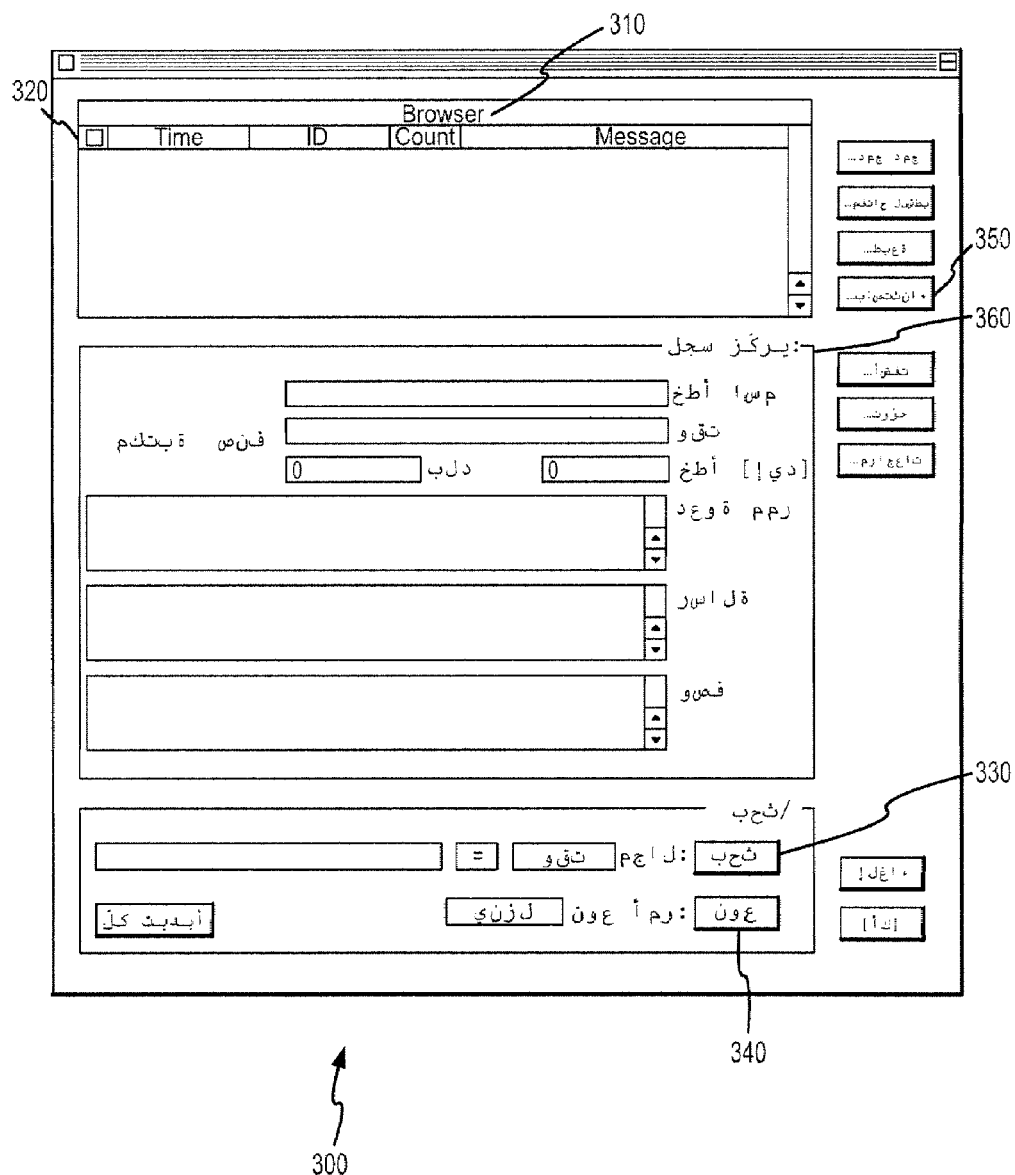
FIG. 3 illustrates a sample screen that has been translated from English to Arabic.

Referring now to FIG. 2, an "Error Browser" window is illustrated running in English and the user is in the process of selecting the Arabic language from the language selector menu. FIG. 6 illustrates the appearance of the same window after translation into Arabic. As FIG. 3 illustrates, no translation for the English phrase "Browser" 310 was found (nor for the titles of the columns 320 in the top list) in the dictionaries and thus these strings 310, 320 are still displayed in the original English (see the algorithm for the DrawString described above). If the user subsequently added a translation for these phrases then these strings also would be translated in future window invocations. Note also that in addition to translating the window text, the UI has been flipped automatically from left to right. This is because Arabic is a right-to-left script and thus window layouts should be reversed for natural operation in this script. This tie-in to the window layout has not been discussed above since the mechanism for achieving this is highly dependant on the GUI environment in use; however, the ability to make these dynamic GUI layout changes is another key advantage of the Just In Time ("JIT") translation approach because any such operations can simply be added to the rendering process (described above). Note also that the Arabic font used in certain buttons 330, 340 (e.g., "Search" and "Sort") has been reduced in size from that in the English equivalent and also un-bolded (while maintaining text centering in the control). This is because the corresponding Arabic text would not fit in the available control text area in the original size and style. Again this process is accomplished within the routine UI_ShrinkToFit( ) as described above. As part of the translation process, the justification of the strings has also been flipped from left/right to the opposite thus ensuring that in the translated window, the labels adjacent to the field boxes now correctly butt up against the controls after the UI has been flipped. Finally, note that many of the buttons and labels end in punctuation 350, 360 (e.g., '. . . ,' and ':'). The DrawString( ) callback is designed to strip off this punctuation and then re-append it in translated fonTn after the main body of the text has been translated. This reduces clutter in the dictionaries by avoiding the need to have two translations for a given string, one with punctuation, and one without.

The foregoing description of the preferred-embodiments of the invention has been presented for the purposes of illustration and description. For example, although described with respect to English, any language could be used as the "base" language from which the dictionaries are generated. This term should not be narrowly construed to only apply to English based translation as the method and system could be used to convert between any two languages. Additionally, the claimed system and method should not be limited to text based translation. This invention could be applied to any system in which one or more pieces of information being communicated over a medium (a "token"), such as text strings, sound waves and images, could be translated into a "foreign" language. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A system for translating a token from a base language to one or more foreign language in real-time comprising:

a processor;

logically connected to said processor, at least one storage device for storing and retrieving data and to provide persistent storage;

logically connected to said processor and stored on said at least one storage device, a lookup map, wherein said lookup map maps a characteristic of the token used in the base language to a corresponding characteristic used in the one or more foreign language;

logically connected to said lookup map, one or more language specific dictionaries, wherein said one or more language specific dictionaries maps the base language token into a corresponding token in the one or more foreign language using said characteristic provided by said lookup map;

logically connected to said lookup map, a set of programming instructions processed by said processor and invoked by an automatic translation callback whenever a client application tied to said lookup map attempts to render the base language token to an output device, regardless of the origin of the base language token, and without modifying a code of said client application to obtain token strings from localized resources, wherein said set of programming instructions in real-time localize the base language token and display the base language token properly formatted in the one or more foreign language;

when the base language token cannot be mapped because a required said one or more language specific dictionary entry does not exist, a new language specific dictionary entry is created dynamically by said set of programming instructions and logically connected to said lookup map, wherein said base language token is stored in said new language specific dictionary entry; and logically connected to said client application, a display interface, wherein said display interface supports specification and adjustment of one or more of said characteristic provided by said lookup map for display purposes.

2. The system of claim 1, wherein said one or more language specific dictionaries stores one or more initially unmapped entries, wherein said initially unmapped entries are added automatically to said one or more language specific dictionaries by said set of programming instructions whenever an attempt to translate the token in the base language to the one or more foreign language fails due to an absence of a dictionary entry for a base language token string involved, said initially unmapped entries consisting simply of the token in the base language or a reference thereto.

3. The system of claim 2 further comprising:
a user interface for examining a list of said initially unmapped entries stored in said one or more language specific dictionaries and for optionally adding a corresponding translation in said one or more language specific dictionaries thereby completing the mapping.

4. The system of claim 1, wherein the token being translated includes a text.

5. The system of claim 4, wherein said lookup map maps one or more text characteristics in said base language to one or more text characteristics in the one or more foreign language.

6. The system of claim 5, further comprising:
a set of instructions that modifies said one or more text characteristics of the token in the one or more foreign language prior to display on said display interface.

7. The system of claim 6, wherein said set of instructions that modifies said one or more text characteristics modifies one or more of the following characteristics: font, font size, style, bounding rectangle, and margin justification.

8. The system of claim 6, wherein said set of instructions that modifies said one or more text characteristics is a text rendering primitive call supplied by an underlying operating system for an output device involved.

9. The system of claim 8, wherein said set of programming instructions can translate portions of a text string consisting of a format statement similar to that found in the standard C library sprintf( ) function, and substituting any translated parameters back into the complete translated string, including as necessary reordering of a parameter substitution order in the one or more foreign language such that said translated string comprises just a single entry in said one or more language specific dictionaries even though the resultant said translated string may take many forms depending on the parameters substituted.

10. The system of claim 7, further comprising:
an electronic memory logically connected to said processor, wherein said electronic memory stores said set of instructions, said lookup map, said one or more language specific dictionaries, and said set of programming instructions.

11. The system of claim 9, wherein said text rendering primitive call invokes a text rendering functionality in a non-displaying mode in order to determine and adjust rendering parameters immediately prior to said modified text characteristics being used by said set of programming instructions that supports said automatic translation callback.

12. The system of claim 11, wherein said set of programming instructions that supports said automatic translation callback takes as a minimum set of parameters an optional dictionary selector, a target language, a format string in the base language, an options parameter, and a variable argument list allowing substitution with translation into locations specified via said format string in a manner analogous to the standard C library sprintf( ) function.

13. The system of claim 1, wherein said one or more language specific dictionaries is built by utilizing a lexical analyzer.

14. The system of claim 1, wherein said lexical analyzer creates said one or more language specific dictionaries.

15. The system of claim 14, further comprising:
a string list capability.

16. The system of claim 1, wherein the token being translated includes sound waves.

17. The system of claim 1, wherein the token being translated includes one or more images.

18. A method for real-time translation of tokens from a base language to a foreign language, without requiring the tokens to be obtained through specialized Application Programming Interfaces ("APIs") from localized resources, through operations performed in-line with the normal token interface rendering process by modifying the standard rendering chain to intercept all rendering calls for the tokens in the base language and invoking processing instructions necessary to perform the mapping, the method comprising the steps of:
receiving the base language token being translated;
requesting a foreign language token characteristic that corresponds to the mapped characteristic of the base language token;
when the base language token cannot be mapped because a required said one or more language specific dictionary entry does not exist, creating dynamically by said set of programming instructions a new language specific dictionary entry, and storing said base language token in said new language specific dictionary entry;
requesting a foreign language token that corresponds to the mapped translation of the base language token;
obtaining from the standard rendering chain a bounding information and rendering characteristics in effect at a time of rendering;
modifying said rendering characteristics to match necessary characteristics to cause said foreign language token to render acceptably given constraints of a rendering situation in which the token is to be displayed;
with said modified rendering characteristics in effect, transmitting said foreign language token to an interface for rendering; and
restoring said modified rendering characteristics to their former state so that a remaining portion of the standard rendering chain is unaffected by the real-time translation.

19. The method of claim 18, wherein the step of receiving the base language token further comprises:
receiving the base language token from a GUI environment.

20. The method of claim 18, wherein the step of receiving the base language token further comprises the step of:
modifying any underlying operating systems used by a GUI environment to trap said foreign language token prior to rendering on said interface.

21. The method of claim 18, further comprising the step of:
requesting the dimensions of said interface to which said transmitted foreign language token will be rendered.

22. The method of claim 18, further comprising the step of:
determining a manner in which said foreign language token will be communicated by said interface.

23. The method of claim 18, wherein the step of receiving the base language token further comprises:
   receiving a text with the base language token.

24. The method of claim 23, wherein the step of requesting a foreign language token further comprises:
   requesting a foreign language text string associated with a text string in the base language token.

25. The method of claim 24, wherein the step of order mapping is performed by passing a format string in the base language and a variable argument list allowing substitution with translation into locations specified via said format string in a manner analogous to, but extending upon, the standard C library sprintf( ) function.

26. The method of claim 24, further comprising the step of:
   determining a manner in which said foreign language text string will be rendered on said interface.

27. The method of claim 23, further comprising the step of:
   order mapping said foreign language token prior to transmission to said interface.

28. The method of claim 23, further comprising the step of:
   storing a results of translation and a translation context such that a real-time load of translation is reduced.

29. The method of claim 18, further comprising the step of:
   mapping a numeric values using an intermediate conversion process.

30. The method of claim 18, wherein the step of receiving the base language token further comprises:
   receiving a sound waves with the base language token.

31. The method of claim 30, wherein said step of requesting said foreign language token further comprises:
   requesting a foreign language sound waves associated with said sound waves in the base language token.

32. The method of claim 18, wherein the step of receiving the base language token further comprises:
   receiving an image with the base language token.

33. The method of claim 32, wherein the step of requesting said foreign language token further comprises:
   requesting a foreign language image associated with said image in the base language token.

* * * * *